(12) United States Patent  (10) Patent No.: US 8,578,365 B2
Hnida et al.  (45) Date of Patent: Nov. 5, 2013

(54) METHOD IN A COMPUTER SYSTEM FOR PERFORMING DATA TRANSFER AND CORRESPONDING DEVICE

(75) Inventors: Martin Georg Walter Hnida, Teltow (DE); Michael Wilke, Berlin (DE)

(73) Assignee: Otis Elevator Company, Farmington, CT (US)

( * ) Notice: Subject to any disclaimer, the term of this patent is extended or adjusted under 35 U.S.C. 154(b) by 1067 days.

(21) Appl. No.: 12/529,948

(22) PCT Filed: Mar. 9, 2007

(86) PCT No.: PCT/EP2007/002097
§ 371 (c)(1),
(2), (4) Date: Sep. 4, 2009

(87) PCT Pub. No.: WO2008/110181
PCT Pub. Date: Sep. 18, 2008

(65) Prior Publication Data
US 2010/0131941 A1  May 27, 2010

(51) Int. Cl.
*G06F 9/44* (2006.01)
(52) U.S. Cl.
USPC ............................ 717/173; 717/169; 717/172
(58) Field of Classification Search
None
See application file for complete search history.

(56) References Cited

U.S. PATENT DOCUMENTS

| 5,804,778 | A | 9/1998 | Chen et al. |
| 6,487,717 | B1 | 11/2002 | Brunemann et al. |
| 6,986,408 | B2 | 1/2006 | Takuchi |
| 7,028,056 | B1 * | 4/2006 | Hendel et al. ........................ 1/1 |
| 7,694,046 | B2 * | 4/2010 | Howard et al. .................. 710/62 |
| 7,711,565 | B1 * | 5/2010 | Gazdzinski .................... 704/270 |
| 2003/0066062 | A1 * | 4/2003 | Brannock et al. ............. 717/169 |

(Continued)

FOREIGN PATENT DOCUMENTS

| DE | 19816287 A1 | 4/1994 |
| EP | 0939013 A1 | 9/1999 |
| EP | 1420560 A1 | 5/2004 |

OTHER PUBLICATIONS

T. Murata, et al., Choheiretsu Chokosoku Vision Chip System No Seigyo Architecture (Control Architecture of Super-parallel, Ultrahigh-speed Vision Chip System), The Journal of the Institute of Electronics, Information and Communication Engineers, The Institue of Electronics, Information and Communication Engineers, Nov. 20, 1977,vol. 97, No. 386, pp. 161-168.
"Evolutionary modernization of large elevator groups: toward intelligent mechatronics," by Seppo J. Ovaska, Mechatronics 8 (1998) 37-46.

(Continued)

*Primary Examiner* — Kris Rhu
(74) *Attorney, Agent, or Firm* — Carlson, Gaskey & Olds

(57) ABSTRACT

A method in a computer system for performing a data transfer between a first data processing device (1) and a second data processing device (2) comprises providing a downloading process (10) configured for downloading of data (120) from the first data processing device (1) to the second data processing device (2) via a connection between the first data processing device (1) and the second data processing device (2) Further, the method comprises providing at least one download parameter (101-111) for the downloading of the data (120), the down load parameter containing information for indicating a downloading destination (8, 81) on the second data processing device (2), and providing a loader data file (5) as an input to the downloading process (10), the loader data file including the at least one download parameter (101-111) and the data (120) to be downloaded.

21 Claims, 5 Drawing Sheets

(56) References Cited

U.S. PATENT DOCUMENTS

Figure 1:
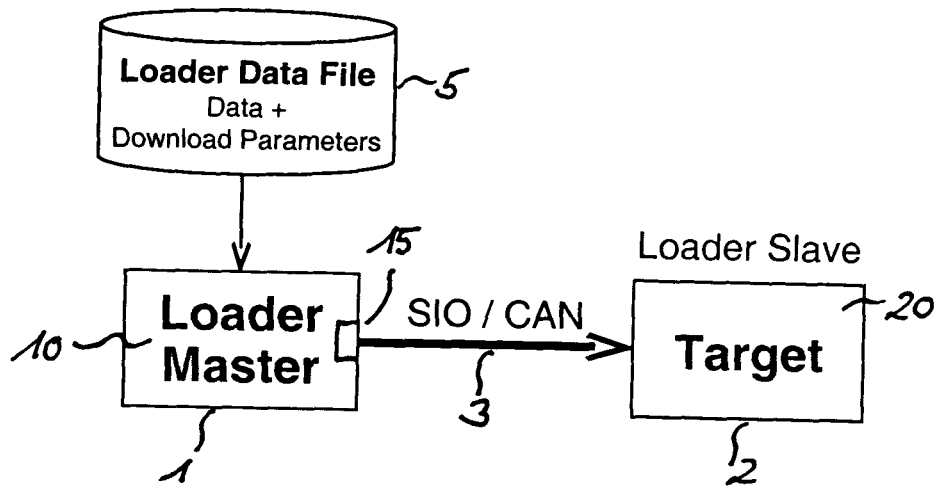

2003/0167407 A1* 9/2003 Howard ................. 713/201
2008/0126603 A1* 5/2008 Hosoya ................. 710/22
2008/0163191 A1* 7/2008 Kania et al. ............ 717/173
2009/0049441 A1* 2/2009 Mii et al. .............. 717/173

OTHER PUBLICATIONS

International Search Report and Written Opinion of the International Searching Authority for International Application No. PCT/EP2007/002097 mailed Feb. 29, 2008.
International Preliminary Report on Patentability for International Application No. PCT/EP2007/002097 mailed Jun. 23, 2009.

* cited by examiner

Target Memory

**Application
Loader Data File**

**Loader
Loader Data File**

METHOD IN A COMPUTER SYSTEM FOR PERFORMING DATA TRANSFER AND CORRESPONDING DEVICE

Methods for performing data transfer between different data processing devices in a computer system are employed in many fields of technology. For example, such methods are employed when programming or updating a second data processing device with code or data stored in a first data processing device. When any kind of data is transferred between a first data processing device and a second data processing device, such data transfer process is also known as a so-called downloading process which is configured for downloading the data from the first to the second data processing device. Conversely, when a data transfer process is employed from the second data processing device to the first data processing device, this process is also known as a so-called uploading process configured for uploading of data from the second to the first data processing device.

Generally, when performing a downloading and/or uploading process there is required a download/upload tool that supports data transfer to/from different targets. Particularly, such download/upload tool is configured to provide input to the downloading/uploading process providing information for indicating to the downloading/uploading process which data and to/from which target the data are to be downloaded/uploaded.

Such or similar data transfer processes and tools may be employed, for example, in the field of people conveyor systems such as elevator systems. Modern people conveyor systems employ control systems which make it possible to realize numerous different applications, requirements and environments of the respective conveyor system. For example, an elevator system needs to know in which floor there is a door, i.e. the allowed landing floors, in the elevator control, in motor control or in door control, for example. By way of another example, such conveyor system may also store information as to the rights of operation of the conveyor system, which rights of operation may be altered for instance by suitably modifying the system control data.

When a control system of such people conveyor system is being installed, the system-specific configuration and application data are transferred to the respective control system. Some of the system-specific configuration and data may also change after installing. When installing and/or servicing such system, the installation or service personnel may need to make modifications in the programming of the control system, for example, because of the user's requirements and/or the different environment of the respective installation. When transferring the system-specific configuration and application data to the control system, the installation or service personnel may employ a data transfer process as described herein above. This is generally done via an operator interface such as a mobile computer having a download/upload tool installed therein which is fitted in conjunction with the control unit of the respective system installation.

A download/upload tool that is adapted to support different targets requires to be configured before every download and upload process. Such configuration of the download/upload tool may require entering respective parameters, such as the downloading/uploading destination, interactively by the user, such as the installation or service personnel, which however implies the risk of human errors. Further, such parameters may be stored in a separate configuration file used as input for configurating the download/upload tool. In addition to such separate configuration file, another data file may be used storing the data to be downloaded/uploaded, which handling of file pairs implies the risk that the two files used may diverge caused, e.g., by renaming or modification. This provides the disadvantage that a failure may occur during the data transfer process.

Accordingly, it would be beneficial to provide a method for performing a data transfer between two different data processing devices, by means of which the reliability of the data transfer process may be increased.

Exemplary embodiments of the invention include a method for performing a data transfer between a first data processing device and a second data processing device, in which a downloading process configured for downloading of data from the first to the second data processing device is provided, wherein further providing at least one download parameter for the downloading of the data, which at least one download parameter contains information for indicating a downloading destination on the second data processing device. A loader data file is provided as an input to the downloading process, wherein the loader data file includes the at least one download parameter and the data to be downloaded.

Other embodiments of the invention include a corresponding computer-readable medium comprising computer-executable instructions adapted to cause a data processing system comprising the first and second data processing device coupled with each other to perform the method steps as disclosed herein.

Other embodiments of the invention include a corresponding data processing device having processing means arranged or programmed for performing such method steps in a computer system, and a people conveyor system, such as an elevator system, comprising at least one such data processing device for controlling at least part of a function of the people conveyor system.

Figure 2:
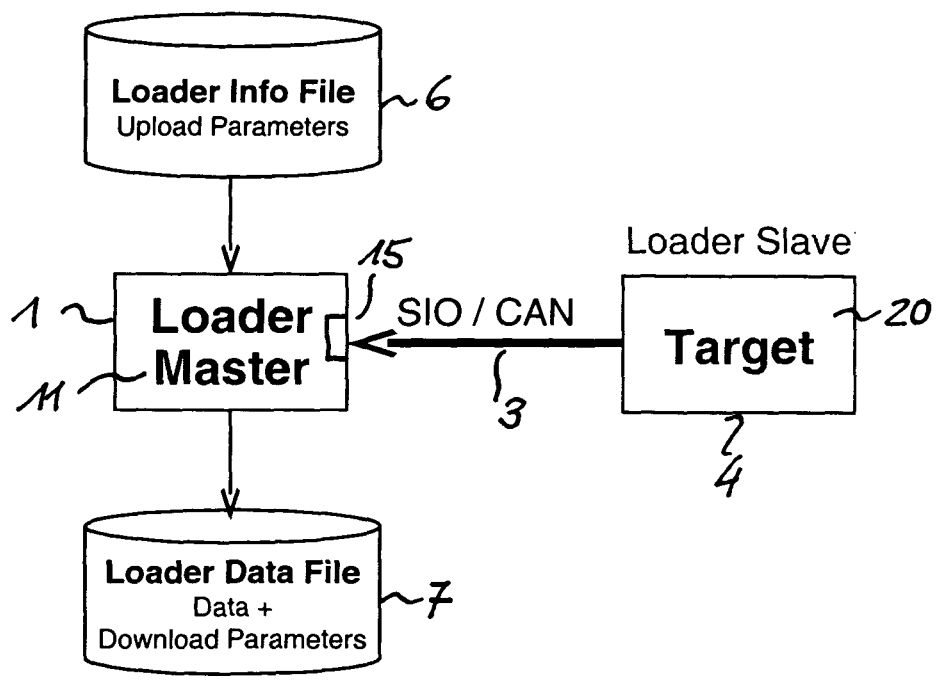
Figure 4:
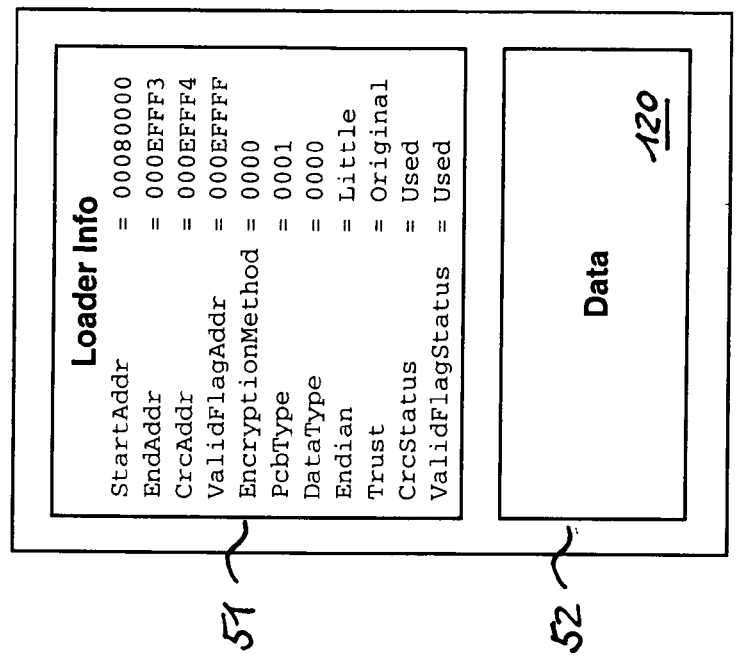
Figure 3:
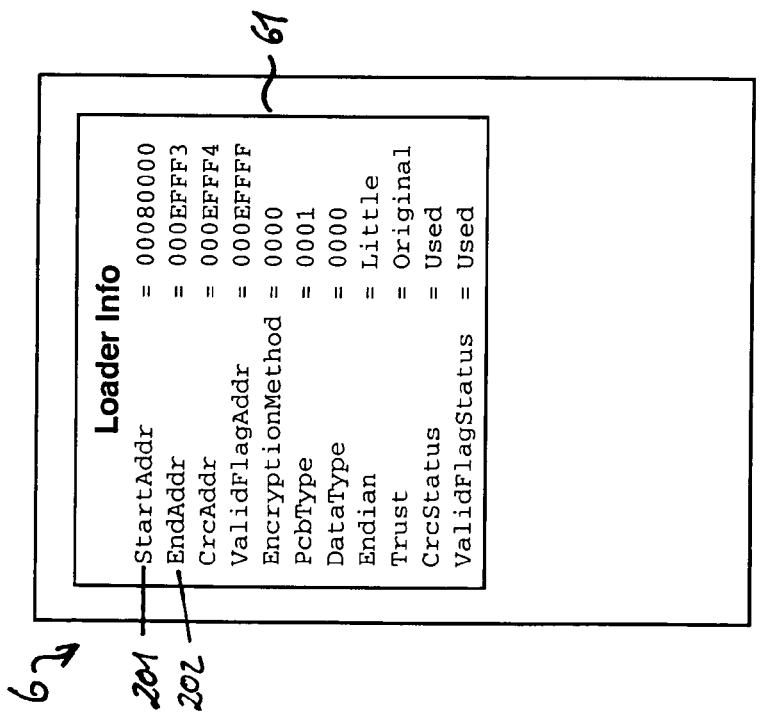
Figure 5:
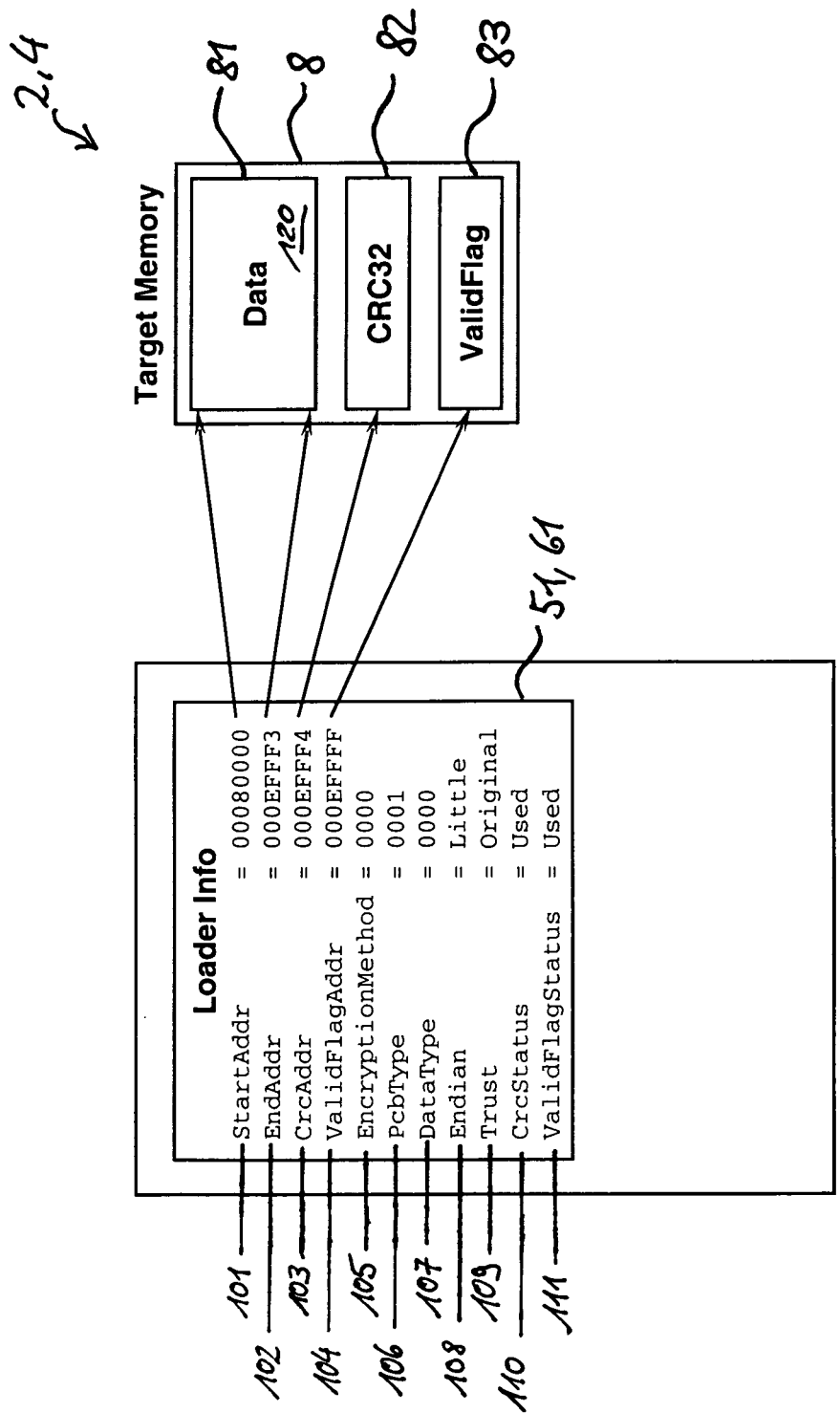
Figure 6:
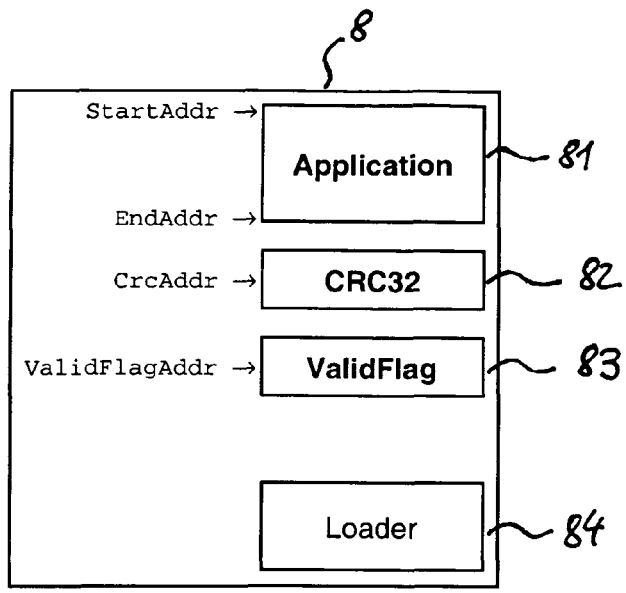
Figure 7:
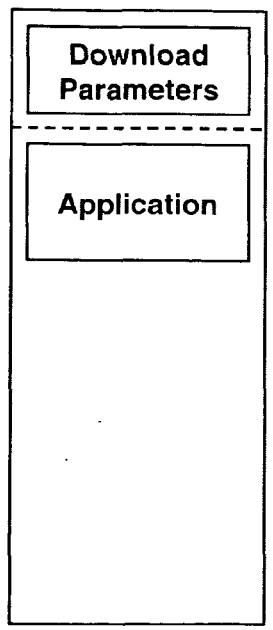
Figure 8:
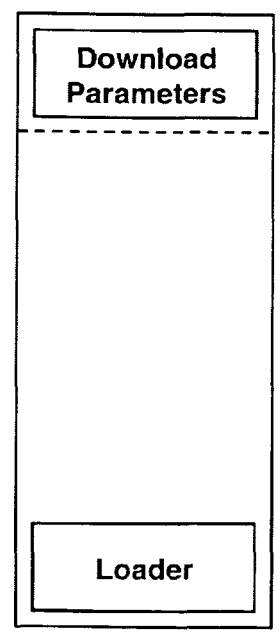
Figure 9:
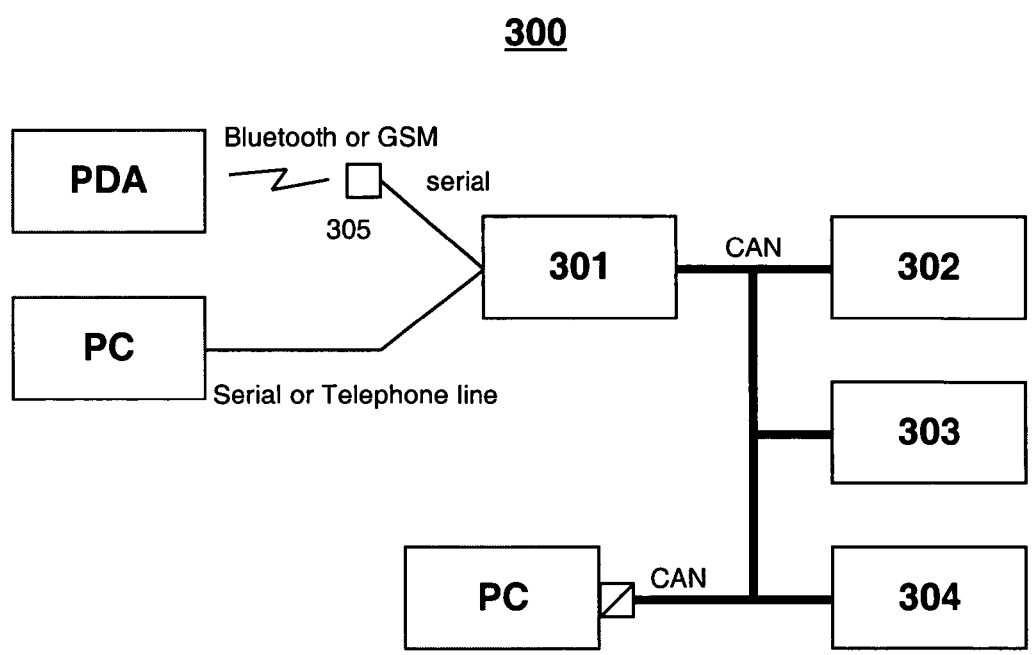

Embodiments of the invention are described in greater detail below with reference to the Figures of the accompanying drawings, wherein:

FIG. 1 shows a schematic block diagram according to one exemplary embodiment of the invention depicting a first and a second data processing device coupled with each other for data download from the first to the second data processing device, FIG. 2 shows a schematic block diagram according to another exemplary embodiment of the invention depicting a first and second data processing device coupled with each other for data upload from a third to the first data processing device, FIG. 3 shows a schematic illustration of a loader information file used particularly for uploading from the third to the first data processing device, FIG. 4 shows a schematic illustration of a loader data file used particularly for downloading of data from the first to the second data processing device, FIG. 5 shows a portion of the loader information file and loader data file of FIGS. 3 and 4, respectively, in relation to a target memory for storing information, FIG. 6 shows a schematic illustration of an exemplary embodiment of a target memory for storing of information according to the loader data file of FIG. 4, FIGS. 7 and 8 show schematic illustrations of different exemplary loader data files, FIG. 9 shows an exemplary embodiment of an elevator control system adapted for using the concept of the present invention.

FIG. 1 shows a schematic block diagram according to one exemplary embodiment of the invention. Particularly, a first data processing device 1 is coupled with a second data processing device 2 by means of a bus connection 3 which may be of any kind suitable for the present purpose, such as a serial I/O bus (SIO) or a CAN bus. The bus 3 is connected to the first data processing device 1 through an interface connection 15, which may comprise e.g. respective I/O terminals and any other suitable interface circuitry such as input/output buffers. The first data processing device 1 is provided with a download/upload tool running on the first data processing device 1 which is designated in FIG. 1 as "loader master". The loader master tool provides a downloading process 10 which is configured for downloading of data from the first data processing device 1 to the second data processing device 2 via bus connection 3. Accordingly, the second data processing device 2 is designated in FIG. 1 as target. On second data processing device 2 another download/upload tool 20 is running designated as "loader slave". The loader slave tool is capable to communicate with the loader master tool by means of an appropriate communication protocol.

As further schematically shown in FIG. 1, a loader data file 5 is provided as an input to the downloading process 10 running on data processing device 1. The loader data file 5 will be described in more detail with reference to FIG. 4.

FIG. 4 shows a schematic illustration of the exemplary loader data file 5 used as an input to the downloading process to be performed between the first and second data processing devices 1, 2. The loader data file 5 includes a first portion 51 and a second portion 52, which are schematically shown separated from each other for illustration purposes. However, any other suitable partitioning technique of the loader data file may be employed, particularly also including methods which use, e.g., convoluted or scrambled file partitioning. The first portion 51 of the loader data file 5 comprises at least one download parameter, in the present case multiple download parameters, for the downloading of the data 120 which are included in the second portion 52 of the loader data file 5. In the present embodiment, the download parameters specifically contain information for indicating a downloading destination on the second data processing device 2, as explained in more detail herein below. For instance, at least one download parameter may include an address information (StartAddr, EndAddr) for indicating a memory portion on the second data processing device 2 in which the data 120 to be downloaded are to be stored. Thus, according to the present invention, both the at least one download parameter and the data to be downloaded are integrated in a single file, designated as the loader data file 5. The integration of download parameter and the data to be downloaded in a single file guarantees that both parts always match and cannot diverge. A download process is thus fully defined or configured by the loader data file which includes both the at least one download parameter and the data to be downloaded.

For explaining and describing the download parameters used in the exemplary embodiment of FIG. 4 in more detail, reference is made in the following to the diagram of FIG. 5.

According to FIG. 5, the address information for indicating a memory portion on the second data processing device in which the data to be downloaded are to be stored, as discussed above, is designated at 101 and 102. As schematically shown in FIG. 5 with respect to the target memory 8 included in the second data processing device 2, the start address 101 and end address 102 indicate a memory portion 81 in the target memory 8 in which the data 120 to be downloaded are to be stored. Particularly, the data to be stored in the target memory are stored at addresses of the target memory portion 81 between the start address 101 and the end address 102.

Furthermore, the download parameters included in the first portion 51 of the loader data file 5 may include an information which allows for checking whether the data to be downloaded are correct. For example, such information may include a check sum, more particularly information related to a so-called cyclic redundancy check (CRC) which may be, in the present example, 32 bit large designated as CRC32. The use of a CRC provides increased safety as to the checking whether the data to be downloaded are correct, compared with using of an ordinary check sum. The address where the CRC information is to be stored is designated at 103 and indicates a memory portion 82 on the target memory 8 of the second data processing device in which the CRC information is to be stored. Furthermore, a parameter 110 may be employed which indicates whether the cyclic redundancy check is actually used in the respective application, or not. Accordingly, the parameter 110 may assume the status "used" or "unused".

Further, the download parameters included in portion 51 of the loader data file may include an information which allows for checking whether the data to be downloaded are valid. For instance, a flag-bit is used as so-called "ValidFlag" which allows the system to rapidly check whether the data 120 are valid. The information may include an address 104 which designates the memory portion 83 on the target memory 8 in which such flag information may be stored. Parameter 111 indicates whether such flag information is used or not, and accordingly assumes the status "used" or "unused".

Moreover, the download parameters may include an information which indicates a process for encrypting the data to be downloaded or uploaded, respectively. For example, different encryption methods may be designated at parameter 105 with different numbers. Using an encryption method provides the advantage of increasing safety as to the data transfer between the data processing devices, particularly with respect to unauthorized access.

According to another embodiment, the download parameters may include an information which indicates whether the data to be downloaded match with at least a portion of hardware of the second data processing device 2. An exemplary parameter is designated at 106 and may include different numbers for different types of hardware such as different types of printed circuit boards used in the second data processing device.

In a further embodiment of the invention, the download parameters may include an information as to the kind of data to be downloaded. For example, parameter 107 may designate by use of different numbers whether the data 120 to be downloaded are program data (application data) or configuration data.

Furthermore, the download parameters may include an information which indicates coding information of the data to be downloaded, particularly in the event the data are divided into respective data portions, a length of a respective data portion of the data to be downloaded. For example, parameter 108 may indicate the endianness of the target processor to allow the loader master tool, e.g., to read or write the bytes of the CRC32 in the target processor's desired byte ordering. Examples may be little endian for least significant byte at lowest address or big endian for most significant byte at lowest address.

According to a further embodiment of the invention, the download parameters may include an information which indicates a type of origin from which the data to be downloaded originate. For example, parameter 109 may indicate when the data to be downloaded originate from the engineering which may be designated with status "original". On the other hand, the status "uploaded" may indicate that the origin of the data was an upload process, e.g. from another target device on which an uploading process has been performed earlier.

Referring again to FIG. 1, a process for downloading of data from the first to the second data processing device is described herein below. By way of a non-limiting example, the first data processing device 1 may be realized as or may be part of a mobile computer system such as an ordinary mobile PC system having appropriate interface ports and circuitry as described above. By way of a non-limiting example, the second data processing device 2 (target system) may be a control system such as a control unit of a people conveyor system as described in the introductory portion of the present application.

According to an embodiment, at first, the data processing device 1 is activated starting the loader master tool providing the downloading process 10. Thereafter, the target system 2 is activated or switched on which runs the loader slave tool adapted for communicating with the loader master tool. In an embodiment, a start routine is running on the target system 2 which performs a query after activating the target system 2 whether a connection with the device 1 has established. For instance, the start routine queries for about one second, just by way of an example, whether a connection on bus connection 3 has established. When there is a response from data processing device 1, the loader master tool starts communicating with the loader slave tool, the loader master tool giving further instructions as to the further processing. Accordingly, the start routine is adapted to wait for a response from the first data processing device 1 whether a connection therewith is established, wherein the start routine switches the target system 2 into a status for loading of data upon a corresponding request from the first data processing device 1.

According to another embodiment, the start routine described above or any other subsequent or antecedent start routine may make an inquiry about the validity information "ValidFlag" stored in memory portion 83 on the target memory 8 indicating whether associated data stored in memory portion 81 are valid. Such start routine may be adapted to switch the target system 2 into a status of normal operation when the validity information "ValidFlag" indicates valid data, and into a wait status waiting for a request from the first data processing device 1 when the validity information "ValidFlag" indicates invalid data.

Referring now to FIGS. 2 and 3, another exemplary embodiment of the present invention will be described. Similar to the embodiment of FIG. 1, two data processing devices are connected with each other by means of a bus connection 3 of the kind as described with reference to FIG. 1. Similarly, the first data processing device 1 may be, for example, a mobile PC system having appropriate interface circuitry and terminals 15. According to one embodiment, a third data processing device may be the same data processing device as described with reference to FIG. 1 (data processing device 2), or may be a different data processing device 4 from which an upload is to be performed. The data processing device 1 is also provided with the loader master tool in the present embodiment, which may additionally comprise an uploading process 11 implemented therein. The uploading process 11 is configured for uploading of data from the data processing device 4 (the target system) to the first data processing device 1. As an input to the uploading process 11 an uploading information file 6 designated as "loader info file" may be provided. The loader info file is an uploading information file for the uploading of data from the target system 4 to the data processing device 1. The loader info file 6 includes at least one upload parameter, in the present case multiple upload parameters, for indicating a source portion such as a memory portion in the data processing device 4 containing the data to be uploaded. Particularly, as indicated in FIG. 3 with parameters 201 and 202, the loader info file 6 may include in parameters portion 61 a start address 201 and an end address 202 indicating the memory portion 81 on target memory 8 of the target system 4 where the data to be uploaded are stored. The loader info file 6 is provided as an input to the uploading process 11.

According to an embodiment of the invention, the loader info file 6 used as uploading information file includes as upload parameters the download parameters of the first portion 51 of the loader data file 5 shown in FIG. 4. Therefore, the same parameter information may be used for the downloading process as well as the uploading process, so that an upload is fully configured by an uploading information file that is the download parameters portion of the loader data file 5.

According to a further embodiment, the uploading process 11 is configured such as to form another loader data file 7 similar to the one of FIG. 4 as a result of the uploading process, which another loader data file 7 is configured to be used as an input to the downloading process 10 (FIG. 1) for downloading of data from the first data processing device 1. For example, programming and/or configuration data from the target system 4 may be uploaded to data processing device 1 generating a loader data file 7 which may be used for a download to another target device, the second portion of the loader data file 7 containing the programming and/or configuration data of the target system 4, so that the programming/configuration data may be duplicated to the another target system not shown in FIG. 2. The loader data file 7 also includes in the first portion thereof the download parameters for such subsequent download process, which download parameters are at least partially set in accordance with the information stored in target memory 8 of target system 4.

According to a further embodiment, the uploading process 11 of the loader master tool may run a cyclic redundancy check (CRC) on the target system 4, comparing the resulting check sum CRC32 with the CRC32 stored in target memory 8. When both check sums coincide, the data stored in memory portion 81 are evaluated as being reliable, whereas when the check sums are different from each other, the data stored memory portion 81 are evaluated as not reliable, creating an appropriate alert to the user. Generally, the parameter 109 ("Trust" according to FIG. 5) may be set to status "uploaded" indicating to the user that the uploaded data do not directly originate from the engineering, but from a different target system.

Referring now to FIG. 6, a schematic illustration of an exemplary target memory for storing of information according to the loader data file of FIG. 4 is shown. In memory portion 81, respective application data are stored in a portion between a start address and an end address. In this context, also different multiple portions each having a particular start and end address may be used for storing the data. With respect to memory portions 82 and 83, reference is made to the corresponding description with respect to FIG. 5 above. Furthermore, memory portion 84 is designated for storing the loader slave tool itself so that the respective target system is adapted for communicating with the loader master tool.

Therefore, according to the invention a new data file structure is used in a data transfer process in order to enhance the data transfer operation between different data processing devices with a view to facilitating the exchange of data among various data processing devices. A computer system operating with such data file structure provides to the user further assistance in transferring data to be downloaded/uploaded from one to another data processing device.

The present invention may be used, in principle, in any field of technology where a data transfer process between different data processing devices is to be established. For example, the method according to the invention may be used for supplying and/or modifying data required in a control system, for instance a control system of a people conveyor system. As such, the data processing devices 2, 4 may be included in a control system of the conveyor system, whereas the data processing device 1 may be included in a separate data processing system such as a mobile PC system as described herein above. With the downloading process, corresponding data stored in the data processing device 1 may be supplied to the control system of the conveyor system comprising data processing device 2. For instance, the downloading process may be employed in at least one of installation, maintenance, repair and modification of the control system of the people conveyor system.

Such downloading process may particularly be useful, for example, when a specific configuration of the installation has changed or when rights of operation shall be altered by suitably modifying the system control data. As a result of the loader data file integrating downloading parameters and data to be downloaded in a single file, the service personnel is not required to manually enter the parameters such as downloading destination interactively, so that the risk of human errors is reduced and handling time is saved.

With regard to the uploading process illustrated with respect to FIG. 2, the service personnel may upload configuration data and application data of the control system of the conveyor system, so as to duplicate the programming of the control system, for example, before downloading a new version of the programming/configuration data to the control system. As the loader data file 7 as a result of the uploading process 11 is automatically generated, the result of the upload in the form of the loader data file can directly be used for another downloading process. The integration of the download parameters and the data in a single file guarantees that both parts always match and cannot diverge. According to another embodiment, the service personnel may be able to upload information relating to failures, diagnosis, bugs, etc. of the installation.

FIGS. 7 and 8 show other schematic illustrations of different examples of loader data files. According to FIG. 7, the loader data file may be used for supplying and/or modifying application data of the respective target system. For example, when used with respect to an elevator installation, the application data may contain programming information, e.g., a program for door control or program for elevator control. On the other hand, as shown with respect to FIG. 8, the loader data file may also contain information as to the loader slave tool itself so that the loader slave tool running on the target system may be modified in a corresponding downloading process.

FIG. 9 shows an exemplary, non-limiting embodiment of an elevator control system 300 as a possible application to the concept of the present invention. The schematically shown components are not complete and/or may be varied in various manner. A handheld device such as a PDA or mobile PC may be connected via a wired or wireless connection of any type with an interface type unit 301, in the present embodiment a panel board or the like to which service personnel may have easy access, and which may have another additional function like control function. For example, a first control unit 302 may function as an operational control of the system. Interface 301 and control unit 302 are coupled via a CAN bus, for instance. A second and third control unit 303 and 304 may communicate with each other and/or with control unit 302 and interface 301 via the CAN bus. They may be used, for example, for subsystem control such as car motion control and/or door control of the elevator system.

The Loader Master tool may run on a device like a PC, laptop, or PDA (personal data assistant). It may be connected to the target by any kind of communication line like serial, CAN, Ethernet, Bluetooth, telephone line, or GSM, using for example another interface 305 as shown. The target may be any of the units 301 to 304. The communication line may go across different media. In the above described elevator control system 300 of FIG. 9, one connection may be the Loader Master tool installed on the PDA or PC connected to the interface 301 using serial connection and/or wireless connection as shown. The interface 301 may convert to CAN and may communicate with any of the targets on the CAN bus. Any connection may be local or remote. The mobile device, for example the PC, may alternatively be directly coupled to any of the units 301 to 304 via the CAN bus, as shown.

The Loader Master tool may also be installed on, e.g., the control unit 302 (or any other unit of the system) for performing a data download to any of the connected components 301, 303 and/or 304. Further, a data upload process from, e.g., the unit 303 to unit 302 may be performed, for instance, when unit 303 is to be exchanged for a new hardware, so that a subsequent download process may be performed from unit 302 to the newly installed hardware in place of unit 303 for fitting the new hardware into the system. In this way, any programming and/or settings of the old unit 303 may be duplicated via control unit 302 onto the new hardware in an easy way.

The Loader Slave tool runs on any target device. The target device may be any module that allows a data download or upload. It may belong to an elevator system, but also may be any device that allows a data download or upload.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method in a people conveyor system for performing a data transfer between a first data processing device and a second data processing device, the second data processing device being a control device of the people conveyor system controlling at least part of a function of the people conveyor system, the method comprising the steps of:

providing a downloading process configured for downloading of data from the first data processing device to the second data processing device via a connection between the first data processing device and the second data processing device;

providing at least one download parameter for the downloading of the data, the at least one download parameter containing information for indicating a downloading destination in a memory portion of the second data processing device;

providing a loader data file as an input to the downloading process, the loader data file including the at least one download parameter and the data to be downloaded;

uploading data from a third data processing device to the first data processing device;
subsequently replacing the third data processing device with the second data processing device; and
subsequently performing the providing steps.

2. The method according to claim 1, comprising
providing an uploading process configured for uploading of data from the third data processing device to the first data processing device;
providing an uploading information file for the uploading of the data from the third data processing device, the uploading information file containing at least one upload parameter for indicating a source portion in the third data processing device containing the data from the third data processing device to be uploaded; and
providing the uploading information file as an input to the uploading process.

3. The method according to claim 2, wherein
the uploading information file includes as the at least one upload parameter the at least one download parameter of the loader data file.

4. The method according to claim 2, wherein
the uploading process is configured to form at least one other loader data file as a result of the uploading process, and
the other loader data file is configured to be used as an input to the downloading process for downloading of data from the first data processing device.

5. A data processing device adapted for communications between the data processing device and a second device that comprises a control device of a people conveyor system controlling at least part of a function of the people conveyor system, comprising:
means for performing data transfer to the second data processing device; and
processing means arranged for
providing a download process configured for downloading of data from the data processing device to the second data processing device via a connection between the data processing device and the second data processing device,
providing at least one download parameter for the downloading of the data, the at least one download parameter containing information for indicating a downloading destination in a memory portion of the second data processing device,
providing a loader data file as an input to the downloading process, the loader data file including the at least one download parameter and the data to be downloaded,
providing an uploading process configured for uploading of data from a third data processing device to the first data processing device,
providing an uploading information file for the uploading of the data from the third data processing device, the uploading information file containing at least one upload parameter for indicating a source portion in the third data processing device containing the data from the third data processing device to be uploaded, and
providing the uploading information file as an input to the uploading process; and wherein
the uploading process is configured to form at least one other loader data file as a result of the uploading process, and
the other loader data file is configured to be used as an input to the downloading process for downloading of data from the first data processing device.

6. The data processing device of claim 5, wherein the second device is a control device of an elevator system.

7. The data processing device of claim 5, wherein the second device comprises a control unit of the people conveyor system controlling at least one associated drive or door component of the system.

8. The people conveyor system of claim 5, wherein the people conveyor system is an elevator system.

9. A method in a people conveyor system for performing a data transfer between a first data processing device and a second data processing device, the second data processing device being a control device of the people conveyor system controlling at least part of a function of the people conveyor system, the method comprising the steps of:
providing a downloading process configured for downloading of data from the first data processing device to the second data processing device via a connection between the first data processing device and the second data processing device;
providing at least one download parameter for the downloading of the data, the at least one download parameter containing information for indicating a downloading destination on the second data processing device;
providing a loader data file as an input to the downloading process, the loader data file including the at least one download parameter and the data to be downloaded;
providing an uploading process configured for uploading of data from a third data processing device to the first data processing device;
providing an uploading information file for the uploading of the data from the third data processing device, the uploading information file containing at least one upload parameter for indicating a source portion in the third data processing device containing the data from the third data processing device to be uploaded; and
providing the uploading information file as an input to the uploading process; and wherein
the uploading process is configured to form at least one other loader data file as a result of the uploading process, and
the other loader data file is configured to be used as an input to the downloading process for downloading of data from the first data processing device.

10. The method according to claim 9, wherein
the at least one download parameter includes address information for indicating a memory portion on the second data processing device in which the data to be downloaded is to be stored.

11. The method according to claim 9, wherein
the at least one download parameter includes information which allows for checking whether the data to be downloaded is correct.

12. The method according to claim 9, wherein
the at least one download parameter includes information which allows for checking whether the data to be downloaded is valid.

13. The method according to claim 9, wherein
the at least one download parameter includes information which indicates a process for encrypting the data to be downloaded.

14. The method according to claim 9, wherein
the at least one download parameter includes information which indicates whether the data to be downloaded matches with at least a portion of hardware of the second data processing device.

15. The method according to claim 9, wherein
the at least one download parameter includes information indicating a kind of data to be downloaded.

16. The method according to claim 9, wherein
the at least one download parameter includes information indicating an address of a target processor to allow the download or upload process to read or write data in a desired order of the target processor.

17. The method according to claim 9, wherein
the at least one download parameter includes information which indicates a type of origin from which the data originates.

18. The method according to claim 9, comprising
providing a start routine configured for running on the second data processing device and performing a query after activating the second data processing device whether a connection with the first data processing device has been established,
wherein the start routine is configured to wait for a response from the first data processing device when the connection with the first data processing device is detected,
wherein the start routine is configured to switch the second data processing device into a status for loading of data upon a corresponding request from the first data processing device.

19. The method according to claim 18, comprising
storing validity information indicating whether associated data stored in the second data processing device is valid,
the start routine is configured for making an inquiry about the validity information,
the start routine is configured for switching the second data processing device into a status of normal operation when the validity information indicates valid data, and into a wait status waiting for a request from the first data processing device when the validity information indicates invalid data.

20. The method according to claim 9, wherein
the second data processing device is included in a control system of the people conveyor system.

21. The method according to claim 9, comprising employing the downloading process in at least one of installation, maintenance, repair or modification of the control system of the people conveyor system.

* * * * *